(No Model.) 3 Sheets—Sheet 1.

H. T. RUSSELL.
DIE FOR FORGING NECK AND SPINDLE BLANKS FOR BICYCLES.

No. 250,980. Patented Dec. 13, 1881.

WITNESSES
W. C. Fogg
E. A. Phalen.

INVENTOR
Henry T. Russell,
By Charles E. Pratt,
Atty (No Model.)  3 Sheets—Sheet 2.

H. T. RUSSELL.
DIE FOR FORGING NECK AND SPINDLE BLANKS FOR BICYCLES.

No. 250,980.  Patented Dec. 13, 1881.

WITNESSES
W. C. Fogg
E. A. Phalen

INVENTOR
Henry T. Russell,
By Charles E. Pratt,
Atty (No Model.) 3 Sheets—Sheet 3.

H. T. RUSSELL.
DIE FOR FORGING NECK AND SPINDLE BLANKS FOR BICYCLES.

No. 250,980. Patented Dec. 13, 1881.

WITNESSES
N. C. Fogg
E. A. Phalen

INVENTOR
Henry T. Russell,
By Charles E. Pratt,
Atty

UNITED STATES PATENT OFFICE.

HENRY T. RUSSELL, OF HARTFORD, CONNECTICUT, ASSIGNOR TO THE POPE MANUFACTURING COMPANY, OF BOSTON, MASSACHUSETTS.

DIE FOR FORGING NECK-AND-SPINDLE BLANKS FOR BICYCLES.

SPECIFICATION forming part of Letters Patent No. 250,980, dated December 13, 1881.

Application filed March 12, 1881. (No model.)

*To all whom it may concern:*

Be it known that I, HENRY T. RUSSELL, of the city of Hartford, and State of Connecticut, have invented certain new and useful Improvements in Dies for Forging Neck-and-Spindle Blanks for Bicycles, of which the following is a specification.

My present improvements relate to that part of the bicycle known as the "neck and spindle" of the perch or backbone, which form the connecting parts between the perch proper and the head and front forks of the bicycle, and to modifications in the structure of the same, and to a process for making the same by machinery so as to form a substantially finished form when completed, and to the machinery for making the same. Their nature and objects will be more fully and easily understood from the following brief description, taken in connection with the drawings, in which like letters denote corresponding parts in the different views, and in which—

Figure 1:
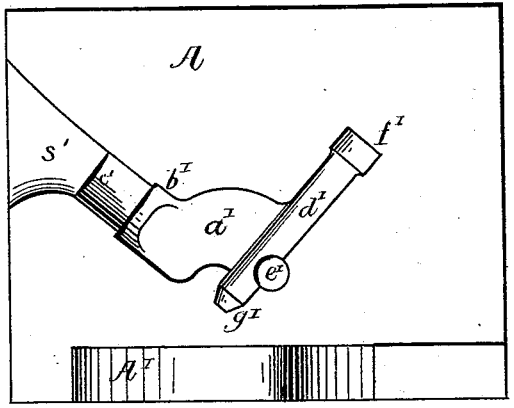
Figure 2:
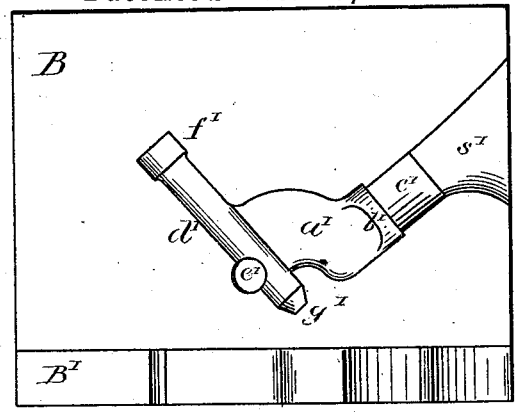
Figure 3:
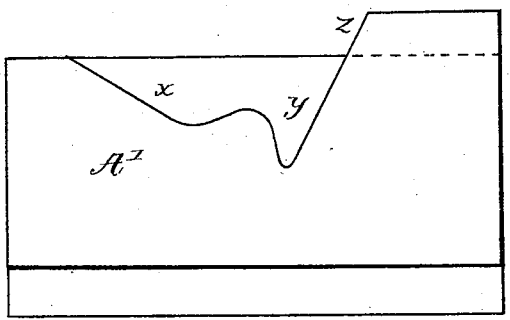
Figure 4:
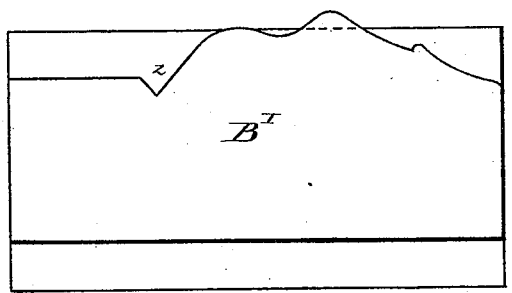
Figure 5:
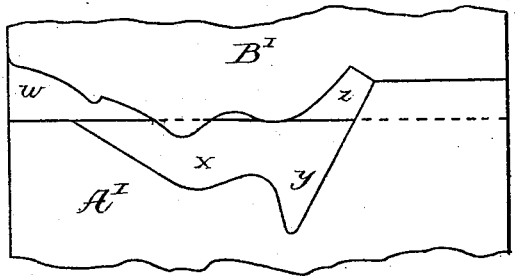
Figure 6:
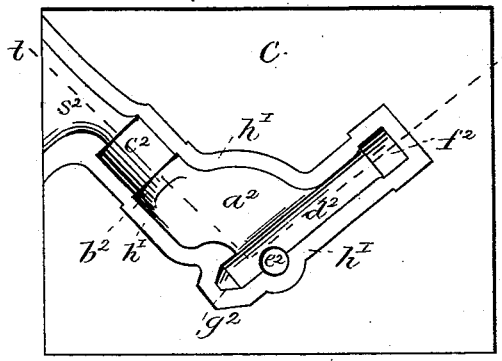
Figure 7:
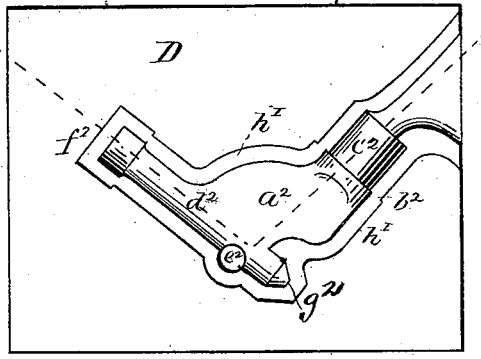
Figure 8:
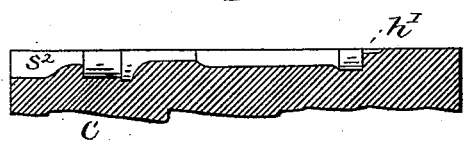
Figure 9:
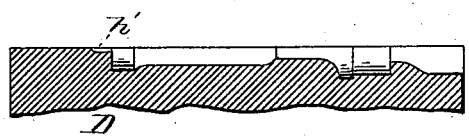
Figure 10:
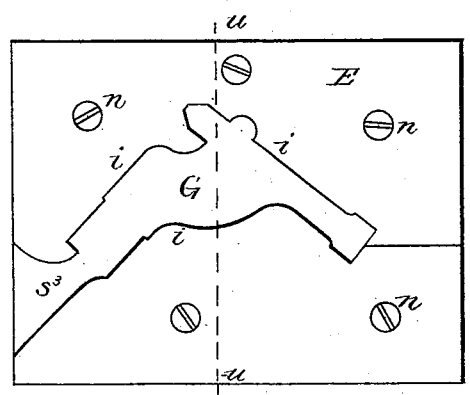
Figure 11:
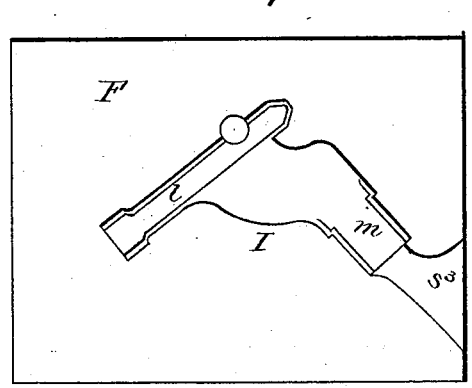
Figure 12:
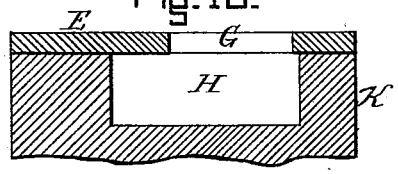
Figure 13:
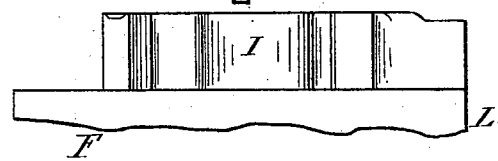
Figure 14:
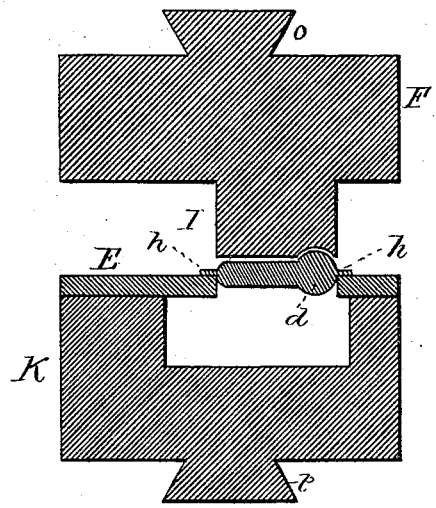
Figure 15:
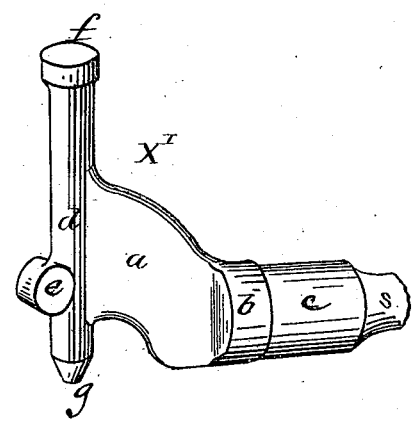
Figure 16:
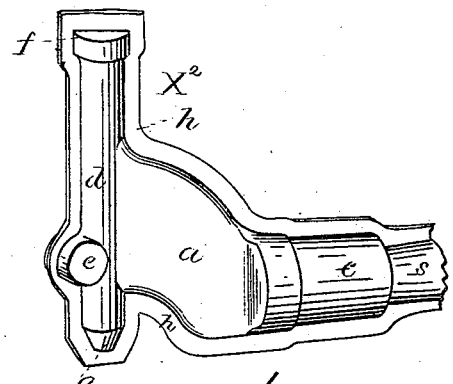
Figure 17:
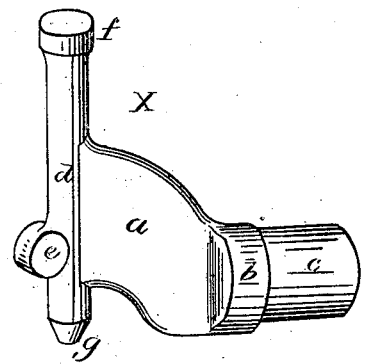

Figure 17 shows in elevation my improved neck-and-spindle blank for the perch as it is when completed, so far as the present process and machinery are intended to finish it; and the remaining figures are intended to show the machinery and the process at the different stages. Figs. 1 and 2 show respectively a top plan view and a bottom plan view of two corresponding duplex dies, which I term "breakdown" and "distributing" dies, consisting in reality of two sets brought together into one. Figs. 3 and 4 show in side elevation the parts of Figs. 1 and 2 represented by A′ and B′, respectively. Fig. 5 shows in side elevation the same parts as shown in Figs. 3 and 4 when they are in position one upon the other, as in actual use. Figs. 6 and 7 show, respectively, in top and bottom plan view, two corresponding steel forming and finishing dies; and Figs. 8 and 9 represent the same in vertical section on the dotted lines $t\ t$. Figs. 10 and 11 show in top plan view a trimmer and punch. Fig. 12 shows a section of the trimmer on the line $u\ u$ in Fig. 10. Fig. 13 shows the punch of Fig. 11 in side elevation. Fig. 14 shows, in section on the line $u\ u$ of Fig. 10, both the trimmer and the punch, as well as the article operated upon, as they are relatively in operation. Fig. 15 shows in side elevation my improved neck-and-spindle blank as it comes in process of construction from the breakdown and distributing dies shown in Figs. 1 and 2. Fig. 16 shows the same as it comes from the trimming-dies shown in Figs. 10 to 14, inclusive, and Fig. 17 shows the same as it finally appears.

The dies shown in Figs. 1 and 2 may be formed by cutting or casting in the surfaces of cast-iron or other metallic blocks together on one pair of blocks, as shown in the figures, (which is the preferable way for convenience,) or on separate blocks, the parts represented at A′ and B′ being the first used in the series, and those represented at A B being the second. These blocks are placed and used in the ordinary way in a drop-forge, the block containing the parts A A′ being the anvil block or die, and that containing the parts B B′ being the hammer block or die; and all the dies referred to in this specification are intended to be used in a drop-forge in a similar way, the first of the two corresponding ones being the anvil-die, and the second the hammer-die.

$w\ x\ y\ z$ in Figs. 3, 4, and 5 are depressions or cavities in the breakdown-dies A′ B′, formed with such proportions and outlines as to distribute the metal properly for succeeding parts of the process.

$a'\ a'\ a^2\ a^2$ are recesses or intaglios cut in their respective dies to correspond with the form of the neck $a$. (Shown in Fig. 17.)

$b'\ b'$, $b^2\ b^2$, $c'\ c'$, $c^2\ c^2$, $d'\ d'$, $d^2\ d^2$, $e'\ e'$, $e^2\ e^2$, $f'\ f'$, $f^2\ f^2$, $g'\ g'$, and $g^2\ g^2$ are respectively recesses or intaglios cut in the dies, as shown, of outline and proportion corresponding to those of the shoulder $b$, the plug $c$, the spindle $d$, the lug $e$, and the blanks $f$ and $g$. (Shown in Fig. 17).

Of these parts $a$ is a solid neck of steel or iron flattened on the two sides and curved on the upper and lower edges, as shown in Fig. 17, connecting the spindle $d$ and the shoulder $b$. This latter $b$ is a cylindrical part chamfered or curved away toward $a$ and having a right-angle shoulder on the opposite end.

$c$ is a plug, which is inserted in the hollow perch to which the neck and spindle described is to be attached, usually by brazing thereto, the shoulder $b$ being of the same diameter or external circumference as the greatest diameter or external circumference on the perch at the end where it is united thereto.

The spindle $d$ is cylindrical in its general form, the axis of which is nearly, but not quite, at right angles, as I generally make it, to the axis of the cylindrical plug $c$, and having at its upper end a blank, $f$, in which is to be cut a concave-cone bearing for one center, and at the lower end of which, at $g$, is a blank adapted to be cut for a convex-cone bearing for another center, the adaptation of these bearings being for corresponding parts in the head of the bicycle.

$e$ is a lug, nearly cylindrical at its ends, immediately in front or on the opposite side of the spindle $d$ from the neck $a$, and adapted to serve as a support and place of attachment for the forward end of the saddle-spring. This location of a lug upon the front or forward side of the spindle for the support of the forward end of the spring serves the double purpose of avoiding the boring of the neck $a$, and of enabling a longer spring to be used than has heretofore been possible where the forward end of the spring is attached in any way to the neck and spindle of the perch.

$h'$ $h'$ $h'$ are slight recesses, cut away in the forming and finishing dies to receive the flash $h$ $h$ $h$ or surplus metal squeezed off at the edges in the process of stamping or forging, and which are important in these dies, following closely the required form, since if these recesses be not left the dies cannot be brought near enough together.

C D in Figs. 6, 7, 8, and 9 are corresponding steel forming and finishing dies, cut intaglio, or having the recesses $a^2$ $b^2$, &c., before described.

E in Figs. 10, 12, and 14 is a steel plate in one or more parts, of considerable thickness, which may be attached to a block or anvil, K, by means of screws $n$ $n$, or otherwise, cut away in its central parts, as at G, so as to form the exact outline of the whole neck and spindle shown in Fig. 16 in its largest contour, and having beneath it and in the block K an opening or cavity, H, large enough to receive and allow to be withdrawn from it the article being formed.

I in Figs. 11, 13, and 14 is a steel punch or die of the general form of one side of the article shown in Fig. 16, and corresponding in exterior outline to the recess G in Fig. 10, and it has depressions or intaglios, as at $l$ and $m$, so as to fit, generally, the side outline of the article shown in Fig. 16, and may be attached by screws or otherwise to a hammer-block, F.

$i$ $i$ $i$ are cutting-edges on the trimmer-die E.

$o$ $p$ are dovetailed tenons on the blocks K and F, by which they may be handled or attached to other blocks.

$s$ is the sprue or part of the metal which connects the article being made to the bar which it is made from; and $s'$ $s^2$ $s^3$ are corresponding recesses or cuttings in the respective dies, allowing it to be preserved during the operation of making the article, at the intersection of which with the article the latter is cut off, as shown in Fig. 17, when it is finished.

X in Fig. 17 is the article of manufacture, consisting of the parts $a$, $b$, $c$, $d$, $e$, $f$, and $g$, before described, which it is the object of my process and machinery to produce, and which I have called my improved "neck-and-spindle blank" for a bicycle-perch.

Having now described the article to be produced, and indicated the machinery I use in its production, I will now describe the operation of this machinery and the process by which I make the neck-and-spindle blank X.

The breakdown-dies being properly placed in a drop-forge, I take the plain bar of iron or steel, usually about one and one-eighth inch in diameter, heat it for several inches at one end to a proper degree for forging, and holding it lengthwise at the end on the part A', I cause it to be struck one or more blows with the part B', thus bending and distributing the metal in the end of the bar into the general form indicated by the cavities $w$ $x$ $y$ $z$ in Fig. 5, and which is substantially such a distribution of the metal as is required for the finished article without waste. I then give the bar, either with or without a reheating, as required, a quarter-revolution, so as to bring the part in the cavity $z$ to the part of the die A represented at $f'$, and the part in cavity $y$ near to the part $g'$ in the die A, and the part at $w$ into the part $s'$ in the die A, and holding the bar in this position, cause it to be struck one or more blows with the die B, which forges the broken-down bar into the general shape required, as shown in Fig. 15. I then reheat the metal, and, the dies C and D being properly placed in a drop-forge, I place the metal on the die C, so that the corresponding parts of X' shall reach the recesses in the die, and cause it to be struck one or more blows with the die D, which brings it substantially or more approximately to the shape required. I then (the trimmer and punch dies E and I being properly placed in a drop-forge) place the article, without heating, on the trimmer E, so that the flash $h$ $h$ $h$ rests upon the cutting-edges $i$ $i$ $i$, and cause it to be struck by the punch I, which forces the article through the aperture G, removing the flash. I then, for completing the form, after heating the article again, place it again on the anvil-die C and cause it to be struck one or more blows with the hammer-die D, when it is given the proper and finished shape required, except for such slight flash as may have been caused by the last operation, to remove which I pass it the second time through the trimmer E, when it appears completely finished, except as to the sprue $s$. It may then be placed on an ordinary anvil-cutter and struck off in the form shown at X in Fig. 17, and is completed, and may be finished up and polished to take its appropriate place in the bicycle mechanism with the least possible amount of hand-work.

It will now readily be seen that the objects of my improvements are to produce a neck-and-spindle blank for the perch of a bicycle forged in one solid piece from bar metal into an improved form, containing all the parts and projections necessary for its final use, and to construct effective and appropriate machinery for the making of such neck-and-spindle blank, and a practicable and mechanical process by which it can be made by power machinery in large quantities, with great rapidity and saving of time and labor, and therefore of expense, and at the same time insure the production of an evenly-forged article without flaws, without welding or other joining of parts, and without the necessity of great labor in finishing.

I claim as new and as my invention—

1. The described neck-and-spindle blank, adapted for an open velocipede-head and constructed with a plug, $c$, and shoulder $b$, whereby it may be attached to a perch or frame, a spindle connected to such plug $c$ by a shank, $a$, and adapted at either end for steering center bearings, and a lug, $e$, formed on the side of the spindle opposite the shank to support the forward end of a spring, essentially as herein set forth.

2. The distributing-dies A' and B', having the recesses $w$ $x$ $y$ $z$, and constructed to operate substantially as and for the purpose set forth.

3. The breakdown-dies A and B, having the recesses $s'$, $a'$, $b'$, $c'$, and $d'$, approximating the form to be given to a neck and spindle for a bicycle-perch, and constructed and adapted to operate substantially as set forth.

4. The forming and finishing dies C and D, cut to contain recesses $a^2$, $b^2$, $c^2$, and $d^2$, conformed to the shape of a neck and spindle for a bicycle-perch, and constructed and adapted to operate substantially as set forth.

5. The trimmer E and punch I, having cutting and forcing edges respectively conformed to the outline of a neck and spindle for a perch, constructed and adapted to operate in combination, substantially as set forth.

HENRY T. RUSSELL.

Witnesses:
GEO. H. DAY,
E. J. POST.